(12) United States Patent
Chiffey et al.

(10) Patent No.: US 8,398,925 B2
(45) Date of Patent: Mar. 19, 2013

(54) WASHCOATED PARTICULATE FILTER SUBSTRATE

(75) Inventors: Andrew Francis Chiffey, Ware (GB); Paul Richard Phillips, Royston (GB)

(73) Assignee: Johnson Matthey Public Limited Company, London (GB)

( * ) Notice: Subject to any disclaimer, the term of this patent is extended or adjusted under 35 U.S.C. 154(b) by 265 days.

(21) Appl. No.: 12/442,265

(22) PCT Filed: Jul. 2, 2007

(86) PCT No.: PCT/GB2007/050371
§ 371 (c)(1), (2), (4) Date: Dec. 21, 2009

(87) PCT Pub. No.: WO2008/035111
PCT Pub. Date: Mar. 27, 2008

(65) Prior Publication Data
US 2010/0170230 A1 Jul. 8, 2010

(30) Foreign Application Priority Data

Sep. 20, 2006 (GB) .................................. 0618482.4

(51) Int. Cl.
*B01D 50/00* (2006.01)
(52) U.S. Cl. ........................................ 422/177; 422/180
(58) Field of Classification Search .................. 422/168, 422/177, 180
See application file for complete search history.

(56) References Cited

U.S. PATENT DOCUMENTS

| 5,665,322 | A | 9/1997 | Kiyohide et al. | |
| 5,855,854 | A * | 1/1999 | Shinzawa et al. | 422/177 |
| 6,827,909 | B1 * | 12/2004 | Bruck et al. | 422/180 |
| 2003/0072694 | A1 | 4/2003 | Hodgson et al. | |
| 2004/0074231 | A1 | 4/2004 | Bruck | |
| 2004/0115392 | A1 * | 6/2004 | Miyakawa et al. | 428/116 |
| 2004/0120865 | A1 * | 6/2004 | Yamamoto et al. | 422/177 |
| 2005/0069675 | A1 * | 3/2005 | Noguchi | 428/116 |
| 2006/0070357 | A1 * | 4/2006 | Yonushonis et al. | 55/282.3 |
| 2006/0188416 | A1 | 8/2006 | Alward et al. | |
| 2006/0217256 | A1 * | 9/2006 | Katoh | 501/1 |
| 2007/0227129 | A1 * | 10/2007 | Sugihara et al. | 60/299 |
| 2009/0217652 | A1 * | 9/2009 | Bergeal et al. | 60/299 |

FOREIGN PATENT DOCUMENTS

| EP | 0 341 832 A2 | 11/1989 |
| EP | 0 341 832 A3 | 11/1989 |
| EP | 1 057 519 B1 | 12/2000 |
| EP | 1 064 094 B1 | 1/2001 |
| EP | 1 276 549 B1 | 1/2003 |
| EP | 1 379 322 B1 | 1/2004 |
| EP | 1 598 104 A1 | 11/2005 |
| JP | 2005-7259 A | 1/2005 |
| WO | 2005023398 A1 | 3/2005 |

OTHER PUBLICATIONS

British Search Report from GB 0618482.4 dated Dec. 1, 2006.

* cited by examiner

*Primary Examiner* — Tom Duong
(74) *Attorney, Agent, or Firm* — Kevin M. Carroll; RatnerPrestia

(57) ABSTRACT

An apparatus comprises a particulate filter substrate for an internal combustion engine, the filter substrate is coated at least in part with a washcoat, and the washcoat comprises a relatively high density material having a density of at least 3.50 gcm$^{-3}$.

15 Claims, 3 Drawing Sheets

WASHCOATED PARTICULATE FILTER SUBSTRATE

CROSS-REFERENCE TO RELATED APPLICATIONS

This application is the U.S. National Phase Application of PCT International Application No. PCT/GB2007/050371, filed Jul. 2, 2007, and claims priority of British Patent Application No. 0618482.4, filed Sep. 20, 2006, both of which are incorporated herein by reference.

FIELD OF THE INVENTION

The present invention relates to a particulate filter substrate for an internal combustion engine, such as a diesel engine, and in particular to a particulate filter substrate coated with a washcoat.

BACKGROUND OF THE INVENTION

Emissions from internal combustion engines, including diesel engines, are limited by legislation put in place by governments worldwide. Original equipment manufacturers (OEMs) are seeking to meet these legislated requirements through a combination of engine design and exhaust gas aftertreatment. The exhaust systems used to carry out exhaust gas aftertreatment commonly comprise a series of catalysts and/or filters that are designed to carry out certain reactions that reduce the proportion of exhaust gas species limited by such legislation. Exhaust gas species limited by legislation include nitrogen oxides ($NO_x$), carbon monoxide (CO), hydrocarbons (HC) and particulate matter (PM).

One exhaust system component for use in treating such exhaust gas species is the particulate filter substrate. Typically, PM trapped in the filter is combusted either actively or passively. One form of passive combustion is to combust the trapped PM in nitrogen dioxide as described in our EP 341832. PM combustion in nitrogen dioxide takes place at temperatures substantially lower than in oxygen (less than 400° C. compared with >550° C.). A convenient way of generating nitrogen dioxide is to oxidise nitrogen oxide in the exhaust gas on a suitable oxidation catalyst disposed upstream of the filter. A device of this nature is marketed by Johnson Matthey as the continuously regenerating trap or CRT®.

One form of active filter regeneration is intermittently to introduce additional hydrocarbon fuel into the exhaust gas and to combust this in order to increase the filter temperature. Combustion of the additional hydrocarbon fuel can be effected on the filter itself by coating the filter with a suitable combustion-promoting catalyst. A suitably catalysed filter is often referred to as a catalysed soot filter or CSF.

During active regeneration the CSF may need to reach temperatures of approximately 600° C. to permit PM to be removed (combusted) at a sufficient rate. However, if during an active regeneration event, a period of low exhaust gas flow occurs, e.g. when the engine/vehicle is caused to idle, the reduced gas flow prevents heat from being removed from the CSF. This can result in parts of the filter reaching temperatures in excess of 1000° C. (see FIG. 1—note that the top of the Figure is the CSF inlet and the bottom of the Figure is the outlet; lighter shades indicate higher temperatures). Such high temperatures can cause two major problems. Firstly, the catalyst can sinter, reducing its surface area and as a consequence catalyst activity is lost. Secondly, high thermal gradients can occur in the substrate leading to mechanical stress caused by differences in thermal expansion. Under extreme conditions the thermal gradients and stresses can cause substrates to crack thereby resulting in a failure of the integrity of the CSF. Therefore, the challenge is in controlling the active regeneration of the CSF so that it can reach temperatures sufficiently high to remove PM but not so high as detrimentally to cause damage to the catalyst and/or the filter substrate.

In order to prevent the filter from reaching such damagingly high temperatures, a heavier filter substrate can be selected. A temperature change in the filter substrate can be represented by equation (1), assuming a quasi-adiabatic system:

$$\Delta T = \text{bulk volumetric heat capacity} \times Q/\text{mass of the filter} \quad (1)$$

where coefficient Q is proportional to the mass of soot on the filter.

It follows that by increasing the mass of the filter, $\Delta T$ is reduced.

However, increasing the mass of, e.g. a cordierite wall flow filter, results in the material containing fewer pores and this in turn undesirably increases back pressure in the system. Increased back pressure results in increased fuel consumption and potentially the necessity for more frequent active regenerations.

It is known from U.S. Pat. No. 6,827,909 B1 to increase the thermal mass of a flow-through monolith substrate by coating a downstream zone thereof with a thicker washcoat so that it can "store" heat for operating conditions that produce lower exhaust gas temperatures, thus maintaining the activity of a catalyst loaded on the monolith substrate during such temperature conditions. The upstream zone has a relatively lower thermal mass, which allows it to reach active temperature more quickly. However, the thicker washcoat can undesirably increase the backpressure in the system as observed in EP 1379322.

We have now devised a means of selectively increasing the mass of a filter substrate without increasing the back pressure to the extent observed in higher mass filter substrates or the use of thicker washcoats.

SUMMARY OF THE INVENTION

According to one aspect, the invention provides a particulate filter substrate for an internal combustion engine, which filter substrate is coated at least in part with a washcoat, which washcoat comprising a relatively high density material having a density of at least 3.50 $\text{gcm}^{-3}$.

The present invention provides a number of very useful advantages. A first advantage is that it increases the design options of the skilled engineer to balance the competing concerns of increased thermal mass and filter porosity at a fraction of the cost of developing and manufacturing a custom substrate filter, and without the attendant problems discussed hereinabove. By washcoating a filter substrate, the porosity of the substrate will decrease. However, by selecting an appropriate particle size for the washcoat materials dependent on the pore size of the filter substrate, the skilled engineer is able to reduce pore blocking and any substantial increases in backpressure. We prefer, for example, to use a washcoat having a particle size D90 of <15 μm, such as <10 μm e.g. <5 μm, to prevent filter pore blockage.

A second advantage of the present invention is that the soot mass limit of a filter substrate can be increased. The soot mass limit is the mass of soot that can be trapped on a filter before active regeneration is required to regenerate the filter. If the soot mass limit is exceeded on a filter, combusting the soot may cause damage to the filter. However, by increasing the thermal mass of the filter one can increase the mass of soot it is possible to trap on the filter before active regeneration is required. Less frequent active regeneration leads to an improved fuel economy.

A third advantage is that because the washcoat material is denser than conventional washcoat materials, it is possible to provide a washcoat of more normal coating thickness having an increased thermal mass. By enabling the use of more normal coating thicknesses, the invention reduces or avoids back pressure issues associated with using thicker coatings in an attempt to increase thermal mass.

A fourth advantage is that, by increasing the mass of the filter it is less likely that the filter and, where present, the catalyst will be damaged by rapid increases in $\Delta T$ (see equation (1) hereinabove).

BRIEF DESCRIPTION OF THE DRAWINGS

In order that the invention may be more fully understood, reference is made to the following drawings, in which.

DETAILED DESCRIPTION OF THE INVENTION

The relatively high density material for use in the present invention can be a refractory oxide selected from the group consisting of densified alpha alumina, densified lanthana, densified cerium II oxide, densified cerium III oxide and densified zirconia. Common properties amongst such materials are low surface area, a refractory nature and a glassy consistency. The materials are also known as "fused". Fused zirconia, for example, has a density of 5.90 gcm$^{-3}$; densified alpha alumina, 3.97 gcm$^{-3}$; densified lanthana, 6.5 gcm$^{-3}$; and densified ceria (cerium II oxide), 7.1 gcm$^{-3}$. Any material having a density of at least 3.50 gcm$^{-3}$ has application in this aspect of the invention. Materials normally used in washcoats for components of exhaust systems commonly have bulk densities of <1.00 g/cm$^3$, e.g. 0.63 g/cm$^3$ for gamma alumina.

Filters suited to use in the present invention may be made of a variety of ceramic materials generally, including silicon carbide, aluminium nitride, silicon nitride, aluminium titanate, alumina, sintered metal, cordierite, mullite pollucite, a thermet such as Al$_2$O$_3$/Fe, Al$_2$O$_3$/Ni or B$_4$C/Fe, or any combination thereof. It may also be a partial metal filter such as the type described in EP 1276549 or a substrate comprising channels having tortuous flowpaths such as that described in EP 1057519.

In one embodiment, substantially a whole length L of the substrate is coated with the washcoat comprising the relatively high density material.

Figure 1:
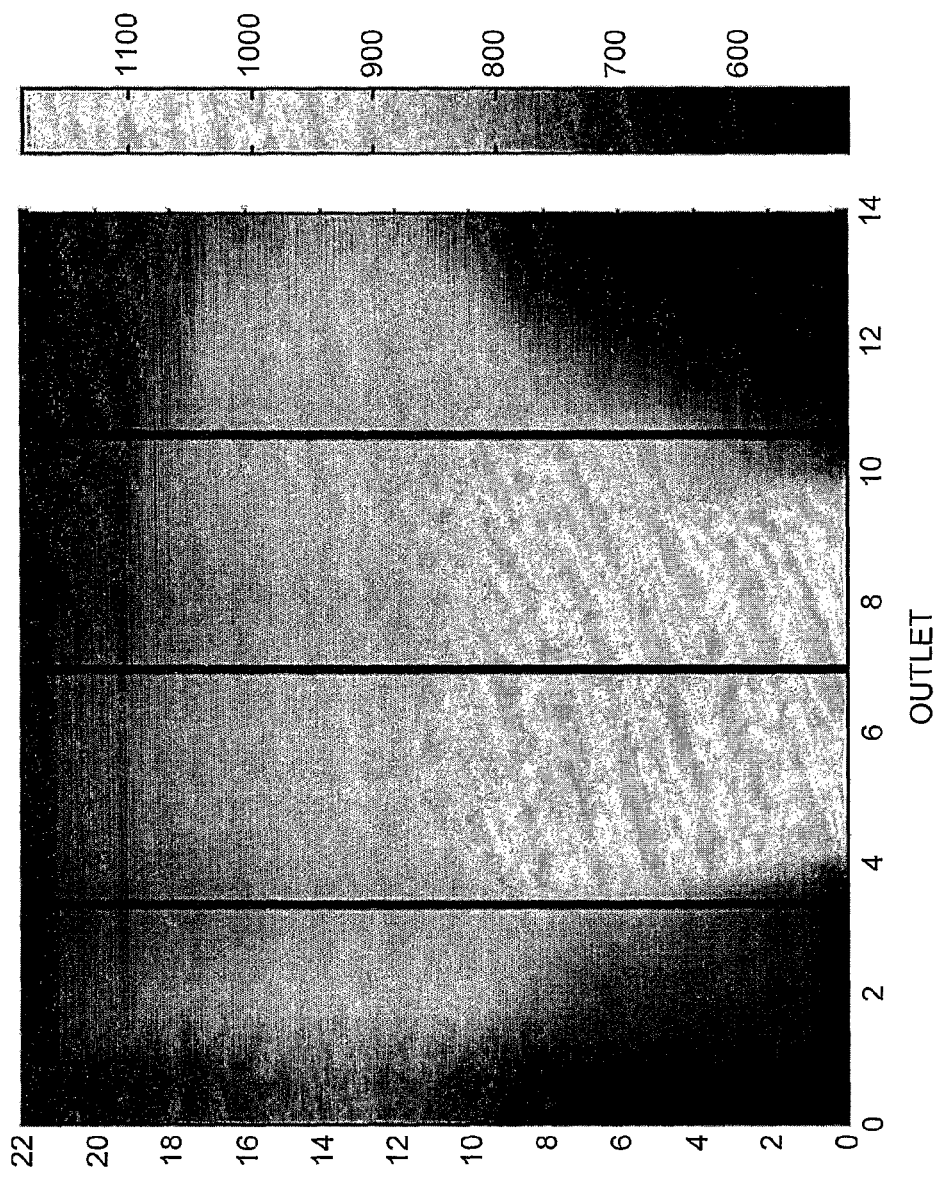
FIG. 1 is a representation of the temperature distribution across a CSF during active regeneration during a period of low exhaust gas flow rate.

To illustrate the temperature gradients that may be reached during active regeneration, reference is made to FIG. 1, which shows a representation from an active CSF regeneration computer model during a period of low exhaust gas flow rate. It can be seen that the rear portion of the filter toward the foot of the Figure achieves very high temperatures and so a zone comprising the rear portion of the filter would be most suited to having a higher thermal mass provided by a washcoat according to the present invention.

Therefore in one embodiment, a zone of substantially uniform length of up to two thirds of a total length L of the substrate from a first end of the substrate is coated with the washcoat comprising the relatively high density material. In this latter embodiment, a zone of substantially uniform length of at least one third, such as up to two thirds, of the total length L of the substrate from a second end of the substrate is coated with a washcoat comprising a relatively low density material having a density of less than 3.50 gcm$^{-3}$. Desirably, there is substantially no overlap between the zone of relatively high density material and the zone of relatively low density material.

In practice, the end of the filter substrate coated with the relatively low density material is disposed upstream. This arrangement has the advantage that the zone comprising the relatively low density material is more easily heated so that the filter as a whole can reach a light-off temperature for active regeneration more readily. The relatively high density material in the rear zone (at least a third of the length L, such as up to two thirds of the length L) is able to retain heat in the filter substrate more effectively during periods in which the filter experiences relatively low exhaust gas temperatures. This has the advantage that less energy is required in order actively to regenerate the filter, i.e. combust soot trapped in the filter, thus improving fuel economy in the system. Furthermore, since the mass of the filter in the downstream zone is increased, this can prevent damage to the filter caused by rapid increases in temperature (according to equation (1)).

With further reference to FIG. 1, it is clear that the central section of the filter tends to reach higher temperatures than the edges of the filter. Therefore, in a further embodiment the relatively high thermal mass washcoat is coated on an axial zone of the substrate, either along the entire length of the filter or on a portion of the filter extending forward of a rear end thereof for at least a third of the entire length of the filter. The remainder of the filter may be coated in a conventional washcoat composition.

To illustrate the fact that washcoat containing the relatively high density material is capable of increasing the thermal mass in a coating without necessarily increasing the coating thickness, we prepared an embodiment wherein a zone of two thirds of the length of a ceramic wall-flow filter from one end thereof was coated with a conventional alumina-based washcoat at 0.6 gin$^{-3}$ and the remaining third was coated with a washcoat containing fused zirconia at 1.8 gin$^{-3}$. The coating thicknesses were found to be similar.

In a zoned embodiment according to the invention, the zone containing the conventional washcoat material can have a washcoat loading of 0.1-1.0 gin$^{-3}$ and the zone containing the relatively high density material can have a washcoat loading of <1.0<4.0 gin$^{-3}$. The coating process may be carried out by methods known per se, including those disclosed in EP 1 064 094.

Filter substrates containing a catalytically active metal or metal compound are known as catalysed soot filters of CSFs and in one embodiment, the or each washcoat material supports a catalytically active metal or metal compound, such as one or more platinum group metal e.g. platinum, palladium, rhodium, ruthenium and mixtures of any two or more thereof. The relatively high density material may or may not act as a support for the catalytically active metal or metal compound. Since it does not have a particularly high surface area, in a particular embodiment, it is not used as a support for the catalytically active metal or metal compound. If the relatively high density material is not used as a support, the washcoat may contain at least one additional washcoat material to act as a support. Such at least one additional washcoat material may be a "conventional" relatively high surface area support material, such as ceria, titania, ceria-zirconia, alumina, silica-alumina or a zeolite.

According to a second aspect, the invention provides an exhaust system for a lean burn internal combustion engine comprising a filter substrate according to the invention.

According to a third aspect, the invention provides an apparatus comprising a lean burn internal combustion engine and an exhaust system according to the invention. In one embodiment, the lean burn internal combustion engine is a diesel (compression ignition) engine.

In fact, in embodiments of this invention comprising a catalysed component for a vehicle exhaust system the material used to coat portions of the substrate of the component may act as a support for any catalyst present. Alternatively the materials used to increase the thermal mass of portions of substrate may not act as a support for any catalyst present. Furthermore, an additional material may be needed to help any coating used to increase the thermal mass of portions of the substrate to bind to the substrate.

Figure 2:
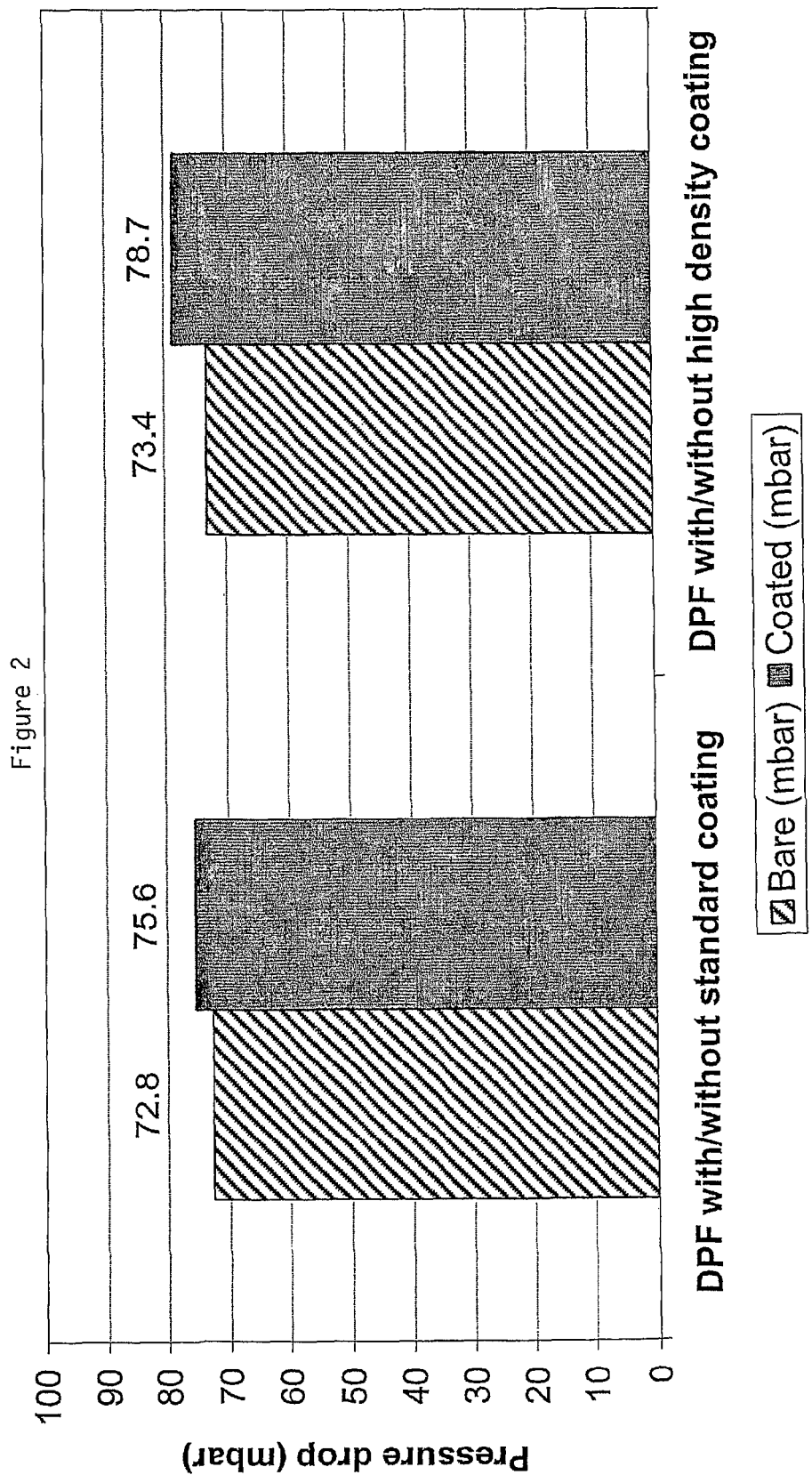
FIG. 2 is a graph showing the pressure drop results for 5.66×6 inches DPF substrates coated with a known mass of a standard CSF coating and three times the mass of a high density CSF coating, as measured on a flow bench at gas flow rates of 600 m$^3$/hour, in initial tests.

Referring to FIG. 2, it can be seen that the relatively high density washcoat material does not statistically significantly affect the backpressure in a CSF compared with a "standard" density washcoat material.

Figure 3:
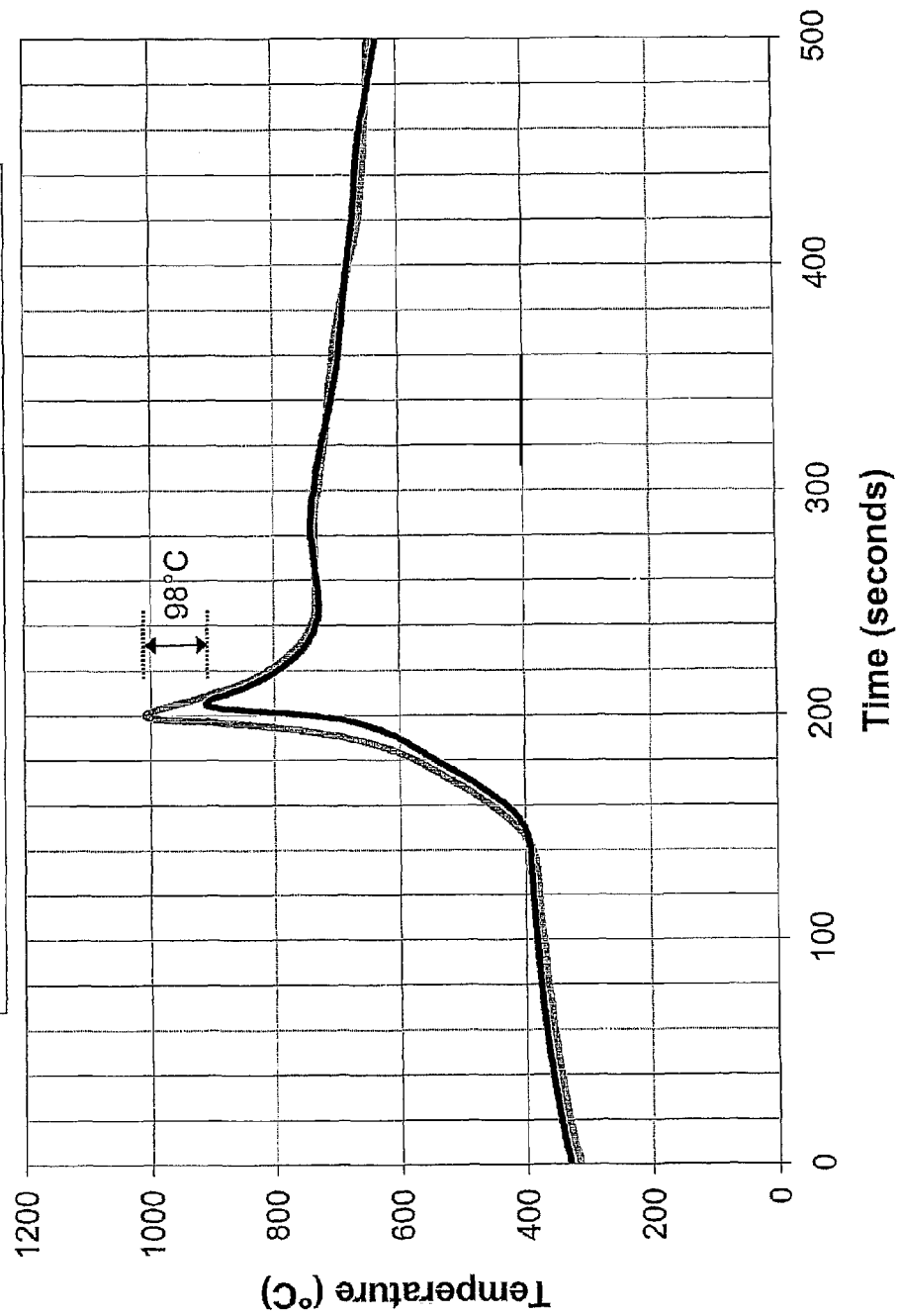
FIG. 3 is a graph plotting internal temperature of a catalysed soot filter taken 30 mm from the rear face thereof against time, showing the benefit of a high density washcoat material in reducing peak temperatures when a diesel engine returns to idle during an active filter regeneration.

FIG. 3 shows the results of an experiment performed on a bench-mounted 2.0 litre turbo diesel engine. A 5.66 inch×6 inch cordierite soot filter was homogeneously coated with a fused zirconia washcoat (D90<5 μm) and homogeneously impregnated with a platinum salt solution to 50 gft$^{-3}$ Pt after drying and calcining A reference catalysed soot filter was prepared identically (including coating thickness etc.), but instead of fused zirconia, a mixture of alumina and $CeZrO_2$ mixed oxide washcoat was used.

The catalysed soot filters were each inserted into the exhaust system of the bench-mounted engine and the engine was run over a defined cycle to achieve a soot loading of 5.9 gl$^{-1}$. The engine was then run over a repeatable cycle including a phase of relatively hard use to achieve relatively high exhaust gas temperatures. As the temperature in the centre rear of the filter (measured using a thermocouple probe located 30 mm from rear face of the filter) reached 400° C. at 150 seconds, the engine was switched to post injection operation, whereby unburned hydrocarbons are emitted from at least one engine cylinder thus increasing the hydrocarbon content in the exhaust gas. The unburned hydrocarbons are combusted on the catalysed filter, thus increasing the temperature in the filter yet further thereby to promote combustion of soot held thereon. Such a procedure for actively regenerating catalysed soot filters is well known to a person skilled in the art. For example, a typical frequency of regeneration is about every 5000 km of vehicular distance traveled.

As the filter reached target temperature for soot combustion of 600° C. at approximately 180 seconds, the engine running speed was cut to idle for the remainder of the test to simulate a "worse case" scenario for active filter regeneration.

It can be seen that at approximately 190 seconds, the temperature in the catalysed soot filter including the reference coating reaches a potentially damaging approximately 1000° C. By contrast, the peak temperature for the test run using the fused zirconia washcoat is 98° C. less than for the reference coating.

The entire contents of each document cited herein is incorporated herein by reference in its entirety.

The invention claimed is:

1. An apparatus comprising a particulate filter substrate for an internal combustion engine, wherein the filter substrate is coated at least in part with a washcoat, and the washcoat comprises a relatively high density material having a density of at least 3.50 gcm$^{-3}$.

2. An apparatus according to claim 1, wherein the relatively high density material is selected from the group consisting of densified alpha alumina, densified lanthana, densified cerium II oxide, densified cerium III oxide and densified zirconia.

3. An apparatus according to claim 2, wherein substantially a whole length L of the substrate is coated with the washcoat comprising the relatively high density material.

4. An apparatus according to claim 2, wherein a zone of substantially uniform length of up to two thirds of a total length L of the substrate from a first end of the substrate is coated with the washcoat comprising the relatively high density material.

5. An apparatus according to claim 1, wherein substantially a whole length L of the substrate is coated with the washcoat comprising the relatively high density material.

6. An apparatus according to claim 1, wherein a zone of substantially uniform length of up to two thirds of a total length L of the substrate from a first end of the substrate is coated with the washcoat comprising the relatively high density material.

7. An apparatus according to claim 6, wherein a zone of substantially uniform length of at least one third of the total length L of the substrate from a second end of the substrate is coated with a washcoat comprising a relatively low density material having a density of less than 3.50 gcm$^{-3}$.

8. An apparatus according to claim 7, wherein only the relatively low density washcoat material supports a catalytically active metal or metal compound.

9. An apparatus according to claim 7, wherein the washcoat comprising the relatively low density material supports a catalytically active metal or metal compound and the washcoat comprising the relatively high density material supports a catalytically active metal or metal compound.

10. An apparatus according to claim 8, wherein the catalytically active metal or metal compound comprises a platinum group metal.

11. An apparatus according to claim 1, wherein the washcoat supports a catalytically active metal or metal compound.

12. An apparatus according to claim 11, wherein the catalytically active metal or metal compound comprises a platinum group metal.

13. An exhaust system for a lean burn internal combustion engine comprising an apparatus according to claim 1.

14. An apparatus comprising a lean burn internal combustion engine and an exhaust system according to claim 13.

15. An apparatus according to claim 14, wherein the lean burn internal combustion engine is a diesel (compression ignition) engine.

* * * * *